UNITED STATES PATENT OFFICE.

ROBERT M. CATLIN, OF FRANKLIN, NEW JERSEY, ASSIGNOR TO CATLIN SHALE PRODUCTS COMPANY, OF WILMINGTON, DELAWARE, A CORPORATION OF DELAWARE.

PROCESS OF MAKING HYDROGEN FLUORID.

1,293,703.  Specification of Letters Patent.  Patented Feb. 11, 1919.

No Drawing.  Application filed June 9, 1917.  Serial No. 173,685.

*To all whom it may concern:*

Be it known that I, ROBERT M. CATLIN, a citizen of the United States, residing at Franklin, county of Sussex, and State of New Jersey, have invented certain new and useful Improvements in Processes of Making Hydrogen Fluorid, fully described and represented in the following specification.

The present invention relates to an improved process for the recovery of hydrofluoric acid from solutions of hydrofluosilicic acid and other fluosilicates.

In my Patent 1,219,438, patented March 20, 1917, I have described a method of making decolorizing material which consists in acting upon certain starting materials containing silica, with hydrofluoric acid. In that case the solids are washed and constitute the desired product. The filtrate is a solution containing fluorin in combination. The recovery of the fluorin as hydrofluoric acid is advantageous for the economical carrying out of the process. One method of recovering the hydrofluoric acid described in that patent comprises the addition of aluminum oxid ($Al_2O_3$) in sufficient quantities to precipitate silica ($SiO_2$), decanting the supernatant liquid, heating it under pressure to crystallize the aluminum fluorid ($AlF_3$), separating the crystalline mass, and then heating it to drive off the hydrofluoric acid as a gas, which is absorbed by suitable contact with water.

I have now discovered that by the use of oxid of iron and particularly the ferric oxid ($Fe_2O_3$), a better and more reliable result is obtained and a simplification of the operations becomes possible.

In carrying out the new process a solution containing the fluosilicates or hydrofluosilicic acid or both is treated with oxid of iron and particularly the ferric oxid, as for example, in comminuted form in sufficient quantity to combine with all the fluorin present in the solution. An excess of the ferric oxid may safely be used and is possible on account of the low cost of the ferric oxid. This results in the precipitation of silica ($SiO_2$) and the formation of an iron fluorid probably $Fe_2F_6$ which remains in the solution. Agitation of the solution will expedite the reaction.

The solution should be heated and most advantageously is heated to near the boiling point, as, for example, in the neighborhood of 93° C.

When the reaction is completed, the solution is filtered to separate the precipitated $SiO_2$ and other impurities. The filtrate may then be evaporated in any usual way until the iron fluorid crystallizes out, or the filtrate may be heated in a closed vessel under pressure, which results in the formation of crystals of iron fluorid. The crystalline product is then separated from the mother liquor.

The solids thus obtained are then subjected to heat treatment in the presence of steam whereby the compound is broken up to set free the fluorin as hydrofluoric acid. Treatment with superheated steam will accomplish the desired result. The residue is iron oxid.

While I have mentioned the use of ferric oxid ($Fe_2O_3$), it is to be understood that this includes either the hematite, or hydrated ferric oxid such as $2(Fe_2O_3).H_2O$.

The gaseous HF driven off may be absorbed in water to give the desired solution of hydrofluoric acid. It is very advantageous to use the mother liquor above mentioned for this absorption. Any suitable absorption apparatus may be employed for this purpose, such as the usual wash tower.

The reactions which occur may be represented generally as follows:

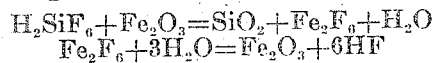

It is to be understood that the above equations are based on the view, heretofore accepted, that silica is properly represented by the formula $SiO_2$ and that fluorin is univalent. More recent views based on experimental data indicate that the molecule of silica is more complex than the formula $SiO_2$ would indicate and probably should be represented by the formula $Si_6O_{12}$.

Also it is possible that in the reactions described hereinbefore the valency of fluorin may vary, it being known that this is possible, as shown by the variations in vapor density of hydrogen fluorid above and below about 89° C. The equations stated, however, are sufficient for practical purposes in determining approximately the relative amount of $Fe_2O_3$ to be added to any given solution containing the elements Si and F.

What I claim is:

1. The process of recovering fluorin as hydrogen fluorid from solutions containing it in combination with silicon, which consists in adding to such solution an oxid of iron, removing the precipitate, crystallizing the iron fluorid from the filtrate, then subjecting the iron fluorid thus obtained to the action of heat and steam, and absorbing with water the hydrogen fluorid thus driven off.

2. The process of recovering fluorin as hydrogen fluorid from solutions containing it in combination with silicon, which consists in adding to such solution $Fe_2O_3$, removing the precipitate, subjecting the filtrate to heat whereby the iron fluorid is crystallized, separating the crystalline mass from the mother liquor, subjecting it to the action of steam and heat to drive off the HF and absorbing the latter with water.

3. The process of recovering fluorin as hydrogen fluorid from solutions containing it in combination with silicon, which consists in adding to such solution an oxid of iron, removing the precipitate, crystallizing the iron fluorid from the filtrate, then subjecting the iron fluorid thus obtained to the action of superheated steam, and absorbing with water the hydrogen fluorid thus driven off.

In testimony whereof, I have hereunto set my hand.

ROBERT M. CATLIN.